March 25, 1924.
J. WARNER
CONFECTION MOLD
Filed June 20, 1922
1,488,138
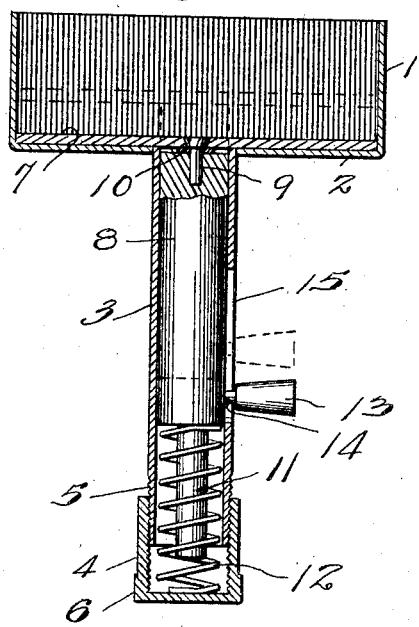
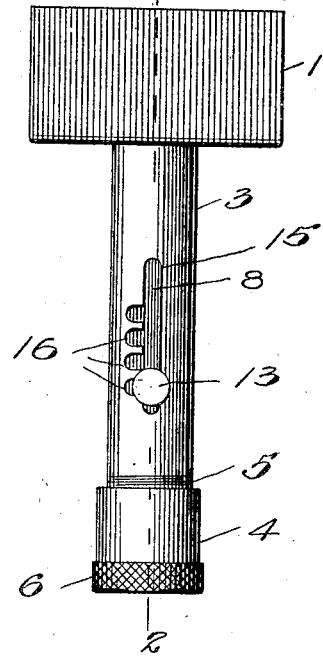
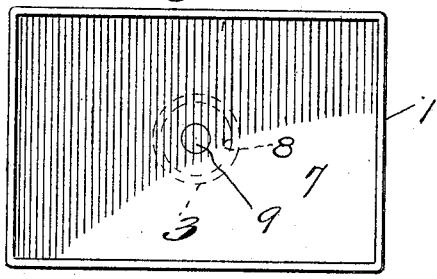
Inventor:
James Warner,
Fenelon B. Brock
Att'y.

Patented Mar. 25, 1924.

1,488,138

UNITED STATES PATENT OFFICE.

JAMES WARNER, OF OGDEN, UTAH.

CONFECTION MOLD.

Application filed June 20, 1922. Serial No. 569,597.

*To all whom it may concern:*

Be it known that I, JAMES WARNER, formerly a citizen of the Netherlands, and who have applied for citizenship in the United States, residing at Ogden, in the county of Weber and State of Utah, have invented new and useful Improvements in Confection Molds, of which the following is a specification.

This invention relates to confection molds designed especially for use in making ice cream wafers, ice cream sandwiches including cookies or cakes, and other similar novel forms of edibles and confections. The primary object of the invention is the provision of a comparatively inexpensive device of this type which is simple in construction and may be operated with facility, and which is capable of manufacturing confections of this character in various sizes and in a sanitary manner.

In the accompanying drawings I have illustrated one complete example of the physical embodiment of my invention, wherein the parts thereof are combined and arranged according to the best mode I have thus far devised for the practical application of the principles of my invention.

Figure 1 is a view partly in section showing a confection mold constructed according to and embodying the invention, the section being indicated at line 2—2 of Figure 2.

Figure 2 is a view in side elevation of the device of the invention, as seen from the right in Figure 1.

Figure 3 is a top plan view showing the mold box.

As seen in the drawings the mold box 1 is rectangular or oblong in shape, but it will be understood that other shapes or forms may be adopted for the box, which is constructed of suitable material, and fashioned with an open top and fixed bottom 2. The bottom of the box is provided with a central opening in which the tubular handle 3 is fixed, said handle preferably being cylindrical, and of sufficient length to be readily grasped by the hand in which it is held for manipulation. The lower, open end of the tubular handle is provided with an adjustable, screw cap 4 threaded over the exterior threads 5 of the handle, and said cap is provided with a knurled end 6 in order that the cap may readily be turned between the thumb and fingers for lengthening or shortening that portion of the cap below the handle, for a purpose to be described.

Within the mold box is arranged a movable tray 7, forming an adjustable, false bottom for the mold box, and conforming to the dimensions and shape of the interior of the mold box.

The tray is relatively movable in the box and is supported from a stem 8 located in the tubular handle 3 and fitting neatly therein, in order that the stem may be raised or lowered and also turned within the tubular handle.

A swivel pin 9 is used as the connecting element between the tray and stem, and while the tray is retained within the mold box against turning, the stem may be turned within the fixed tubular handle, relatively to the tray which is supported thereby. A bearing ring or washer 10 is interposed between the tray and its stem to make a stable joint and to reduce friction, as well as provide for a smooth turning movement of the stem.

At its lower end, the stem is fashioned with a reduced extension or shank 11 about which a spring 12 is coiled, and the spring, which is interposed between the cap 4 and the lower end of the stem 8, normally tends to project the stem up through its handle and the tray upwardly through the mold box.

This tendency of the spring is controlled by the use of a knob 13 which is fixed to the stem by a pin 14 and projects laterally from the tubular handle. At 15 the tubular handle is provided with a slot that extends longitudinally thereof to accommodate the pin 14 and form a path of movement therefor, and one wall of this slot is fastened with a series of notches 16, each adapted to receive the pin 14 of the knob 13 when the stem is turned for the purpose.

Various thicknesses of confections may be built up in the mold box, as for instance in Figure 1, with the tray 7 at the bottom of the mold box, a maximum size or thickness of ice-cream brick may be molded by packing the required quantity of cream in the mold. Thus, with the pin 14, turned into the lowermost notch 16, the tray and its stem are held in position against the tension of the spring 12. After the required quantity of cream has been packed into the mold box on top of the tray 7, the knob 13 is turned by thumb pressure into the slot 15, and with the tension of the spring thus released, the pressure of the thumb is accordingly released from the knob with the result that the brick of ice cream is projected to the top of the mold box in order that it may be dispensed. In the same manner ice cream sandwiches may be molded by inserting in the mold, first a cake or cookie, then a layer of ice cream, and then another cookie or cake, to which other layers of ice-cream and cookies or cakes may be added, as desired.

To vary the thickness of the confections thus molded, the initial position of the tray is changed, and the pin 14 is turned into the notch 16 corresponding with the position of the tray and the desired thickness of the confection. To change the tension of the spring for adapting it to its functions with the changed initial position of the stem 8 and tray 7, the screw cap 4 is turned on the threaded handle either to compress the spring or to permit its expansion, as required.

It will be understood that various shapes and forms may be given to the mold box and tray for the production of a variety of forms of confections, and the molds may be manufactured in various sizes to adapt them for various purposes. These and other obvious changes are contemplated in the manufacture of the device of my invention, and said changes may be made within the scope of my claim without departing from the spirit of my invention.

Having thus fully described my invention, what I claim as new and desire to secure by Letters Patent is—

The combination of a mold box and handle having adjustable locking means thereon, a tray in the box, a stem in the handle connected with the tray, adjustable locking means on the stem co-acting with the locking means on the handle, a spring between the end of the handle and the stem, and means for adjustably setting the spring pressure in accordance with the predetermined one of the locking engagements in use between the stem and the handle.

JAMES WARNER.